A. P. NIRDLINGER.
TIRE TREAD.
APPLICATION FILED JAN. 31, 1914.
1,176,161.
Patented Mar. 21, 1916.
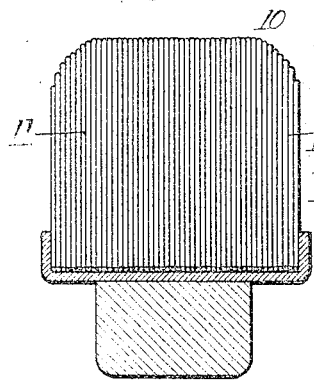
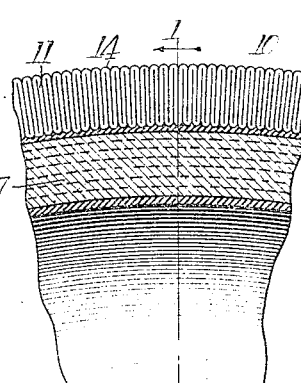
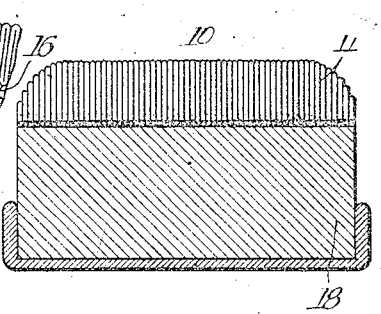
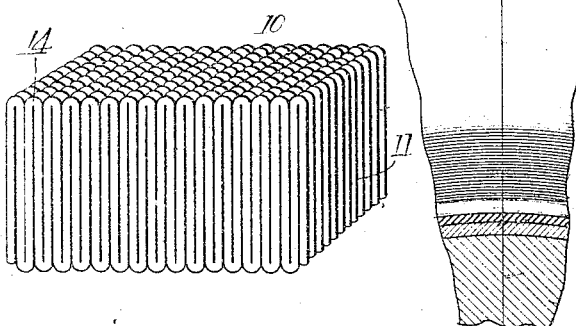
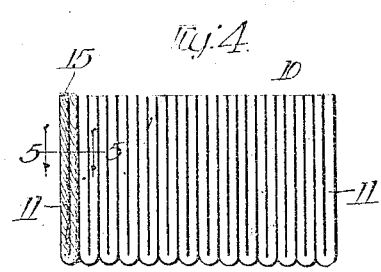
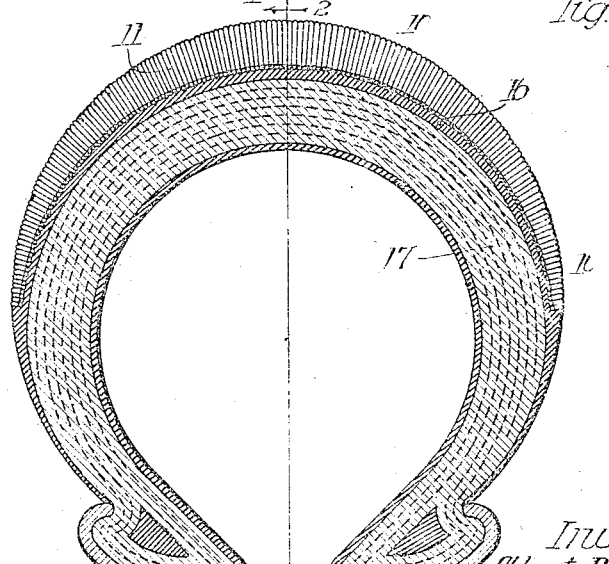
Witnesses:
Robert H. Weir
Arthur W. Carlson
Inventor
Albert P. Nirdlinger
By Brown, Nissen & Sprinkle
Attys

UNITED STATES PATENT OFFICE.

ALBERT P. NIRDLINGER, OF CHICAGO, ILLINOIS.

TIRE-TREAD.

1,176,161.　　　Specification of Letters Patent.　　Patented Mar. 21, 1916.

Application filed January 31, 1914. Serial No. 815,697.

*To all whom it may concern:*

Be it known that I, ALBERT P. NIRDLINGER, a citizen of the United States, residing at Chicago, in the county of Cook and State of Illinois, have invented certain new and useful Improvements in Tire-Treads, of which the following is a specification.

My invention relates to tire treads and has for its primary object the provision of an improved tire tread which shall have means for increasing the wearing properties thereof.

With the above and other objects in view, this invention consists substantially in the combination, arrangement and construction of parts all as hereinafter described, shown in the accompanying drawings which form a part of this specification and illustrate the preferred embodiment of my invention, and more particularly set forth in the subjoined claim.

In the drawings.—Figure 1 is a transverse section of a tire constructed in accordance with the principles of this invention and taken on the line 1—1 of Fig. 2; Fig. 2 is a section taken on the line 2—2 of Fig. 1; Fig. 3 is a perspective detail view of a portion of my improved tread; Fig. 4 is an elevation similar to Fig. 3, but illustrating a worn condition of the bearing face of the tread; Fig. 5 is a magnified section taken on line 5—5 of Fig. 4; Figs. 6 and 7 illustrate various methods of constructing tires in accordance with the principle of this invention.

Reference numeral 10 indicates generally my improved tire tread, which is made up of closely associated threads 11, each thread being preferably composed of a plurality of strands 12 (see Fig. 5). The threads 11 are placed approximately parallel longitudinally in the construction of the tread and are closely associated together by any convenient adhesive, the preferable medium being rubber. In that embodiment of the invention found to be at present most practicable, the threads 11 are of a length co-extensive with the desired thickness of tread. The preferable construction of each of the threads 11 is that of a thread composed of approximately one hundred fine strands of cotton, though any other strand of thread-forming material may be employed if desired, the preferable material, however, being some vegetable fiber. The thread 11 after being formed of the strands 12 is both saturated and coated with a solution of rubber, the saturation and coating being indicated in Fig. 5 by reference numeral 13. With the thread 11 preferably so constructed, the tread 10 is made therefrom by vulcanizing together in close relation and approximately parallel to each other desired lengths of thread. In this construction, as is illustrated at one end of Fig. 4, the fibers of the cotton or other thread-forming strands lie in the general direction of the length of the thread 11, even though the thread be twisted in its construction. It has been found practicable in constructing the tread 10 to employ a plurality of saturated threads and to form the thread lengths 11 by doubling the saturated thread upon itself, as is clearly illustrated in the drawings. In the adaptation of the tread 10 to a tire, the essence of this invention lies in causing the various thread lengths 11 to present their ends to the road surface, and this association of the tread with respect to the tire may be seen in Figs. 1, 2, 6, and 7. While it is true that when the tire is first formed in the folded manner indicated in the drawings it will present a curved portion of thread to the pavement by means of the bends in the thread indicated at 14, in Figs. 2 and 3, this bend 14 will rapidly wear away upon the pavement, leaving a frayed end 15 upon each thread 11 for the reason that the rubber or other adhesive medium employed to saturate the thread 11 and to cause the various threads 11 to adhere together will wear away more rapidly than the thread-forming material of the strands 12. After the tire has been used for a short time, the bends 14 of the exposed surface of the tread will become worn away, leaving the upper edge of the tread as shown in Fig. 4. By reason of the presentation of the ends of the threads 11 and their strands 12 to the pavement, as the tire rubs thereagainst, the wearing away of the tread 10 is greatly retarded and the life of the tread consequently lengthened, for the reason that the strands present greater resistance to wear when friction is applied across their ends than when it is applied longitudinally of the strand.

In Figs. 1 and 2 is illustrated a well-known form of pneumatic tire 17 furnished with the tread 10 in the preferred form, the tread being constructed of greater thickness along the median line of the tire preferably, and tapering toward the sides of the tire. If found desirable, a skin coat 16 may be positioned upon the pneumatic tire as a backing for the improved tread 10.

In Fig. 6 is illustrated a solid tire, the whole resilient body of which is composed of tread material 10, and in Fig. 7 is depicted a tire, the body of which is constructed of any desired resilient material 18 faced with my improved tread 10. It is found practicable in constructing the tread 10 to let the folds of saturated thread be bent into thread lengths 11 and to employ as many separate saturated threads as there are thread lengths 11 in the width of the tread, these saturated threads are each redoubled upon itself with each of the short straight portions between the redoubled portions disposed radially from a central point of a transverse section of the tire at such portion.

It is to be understood that in the construction of the threads 11, those threads after being saturated preferably in a solution of rubber are associated together in as firm a combination as the adhesive material employed will permit of—if rubber is the medium, vulcanizing will accomplish the desired close association of the thread lengths 11.

In the accompanying drawings and the foregoing description is illustrated the preferred embodiment of my invention, but it is obvious that one skilled in the art may make modifications thereof without departing from the spirit of the invention.

I claim:

The combination with a pneumatic tire for vehicles, of a tire tread made up of a plurality of threads disposed side by side longitudinally around the tire, each thread being doubled back upon itself with short straight portions between the bends thereof, said short straight portions being secured to the tread and to each other by vulcanized rubber and extending radially from a central point of a transverse section of the tire at such portion.

In testimony whereof I have signed my name to this specification, in the presence of two subscribing witnesses, on this 31st day of March, A. D. 1914.

ALBERT P. NIRDLINGER.

Witnesses:
H. G. ROCKWELL,
ALLENA OFFUTT.